United States Patent
Procter et al.

(10) Patent No.: US 7,526,909 B1
(45) Date of Patent: May 5, 2009

(54) QUICKLY INSTALLABLE MULCH-TYPE ACCESSORY FOR A WALK-BEHIND OR RIDING MOWER

(76) Inventors: Allen Procter, 1268 E. Berkeley St., Springfield, MO (US) 65804; Susan Procter, 1268 E. Berkeley St., Springfield, MO (US) 65804

( * ) Notice: Subject to any disclaimer, the term of this patent is extended or adjusted under 35 U.S.C. 154(b) by 0 days.

(21) Appl. No.: 12/082,656

(22) Filed: Apr. 14, 2008

(51) Int. Cl.
*A01D 67/00* (2006.01)

(52) U.S. Cl. ..................................... 56/320.2

(58) Field of Classification Search ................ 56/16.7, 56/17.5, 194, 320.2
See application file for complete search history.

(56) References Cited

U.S. PATENT DOCUMENTS

| | | | | |
|---|---|---|---|---|
| 2,726,503 | A | * | 12/1955 | Phelps ........................ 56/17.4 |
| 2,802,327 | A | * | 8/1957 | Thelander ................... 56/17.4 |
| 2,857,727 | A | * | 10/1958 | Cole ........................ 56/320.2 |
| 3,391,524 | A | | 7/1968 | Nickoloff et al. |
| 3,404,519 | A | | 10/1968 | Demers |
| 3,503,194 | A | | 3/1970 | Ritums |
| 4,135,351 | A | | 1/1979 | Akgulian |
| 4,189,904 | A | | 2/1980 | Paker |
| 4,326,370 | A | * | 4/1982 | Thorud ........................ 56/202 |
| 4,435,949 | A | | 3/1984 | Heismann |
| 5,048,279 | A | | 9/1991 | Badawey et al. |
| 5,133,175 | A | | 7/1992 | Dumbrell |
| 5,284,007 | A | | 2/1994 | Poe et al. |
| 5,442,902 | A | | 8/1995 | Mosley et al. |
| 5,483,787 | A | * | 1/1996 | Berrios ........................ 56/10.1 |
| 5,491,964 | A | * | 2/1996 | Butler ........................ 56/320.2 |
| 5,826,417 | A | | 10/1998 | Evans |
| 6,550,563 | B2 | * | 4/2003 | Velke et al. ................... 180/333 |
| 6,854,253 | B2 | | 2/2005 | Dickey |
| 6,857,256 | B2 | | 2/2005 | Strange et al. |
| 6,874,309 | B1 | | 4/2005 | Bellis, Jr. |
| 6,971,224 | B1 | | 12/2005 | Hancock |
| 7,051,504 | B2 | | 5/2006 | Osborne |
| 2004/0237493 | A1 | * | 12/2004 | Schroeder et al. .......... 56/320.2 |
| 2007/0261380 | A1 | * | 11/2007 | Bledsoe ...................... 56/320.2 |

* cited by examiner

*Primary Examiner*—Thomas B Will
*Assistant Examiner*—Mai T Nguyen
(74) *Attorney, Agent, or Firm*—Donald R. Schoonover

(57) ABSTRACT

A quickly installable mulch-type accessory for a walk-behind or riding mower, having a deck with a deck opening for discharging grass clippings, includes a removable mechanism having a covering portion dimensioned to operably cover the deck opening of the mower; a connector mechanism fixedly secured to the deck of the mower, the connector mechanism structured and dimensioned to removably mount the removable mechanism to the deck of the mower wherein the covering portion assumes a blocking position whereat grass clippings are operably prevented from being discharged through the deck opening of the mower; and a lock mechanism structured and dimensioned to selectively and releasably lock the covering portion of the removable mechanism adjacent to and covering the deck opening.

9 Claims, 1 Drawing Sheet

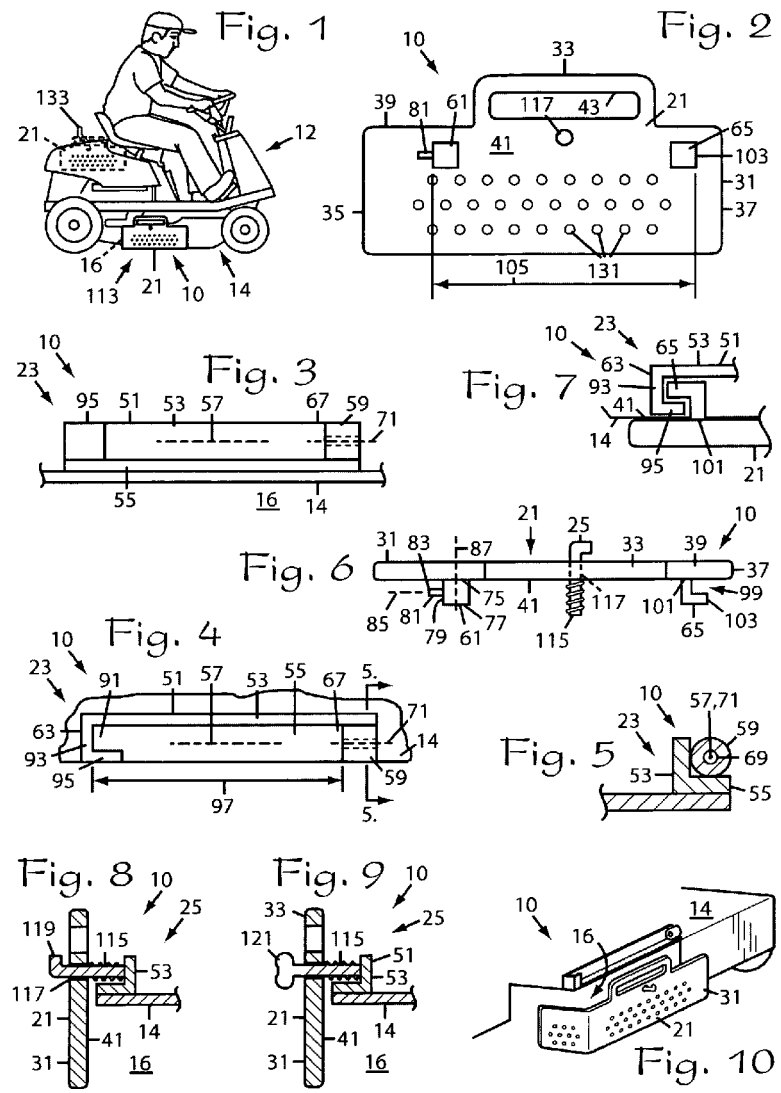

QUICKLY INSTALLABLE MULCH-TYPE ACCESSORY FOR A WALK-BEHIND OR RIDING MOWER

BACKGROUND OF THE INVENTION

1. Field of the Invention

The present invention relates to accessories for mowers and, more specifically without limitation, to accessories for walk-behind or riding mowers.

2. Description of the Related Art

Besides trimming grass to a uniform height, proper mowing requires prevention or removal of grass clippings from various areas for obvious esthetic reasons, such as from sidewalks, streets, driveways, and landscaping. For example, as a lawn is being mowed, grass clippings are typically thrown sideways through an opening in the side of the deck of the mower. As the mower moves alongside a landscaped area, such as an area covered with red lava stone, white rock or the like, the grass clippings being discharged through the deck opening are thrown onto the landscaped area, which can be very unsightly if not promptly removed.

Some mowers have a mulch plate that can be installed on the mower to block the discharge opening so the grass clippings are driven downwardly into the underlying turf to thereby avoid sidewise discharging of the grass clippings. This is not necessarily a desirable solution because mulched grass debris accumulates on the ground around the roots of the grass. Such accumulation commonly creates an excellent media for harboring and propagating various types of mold which may be harmful to otherwise healthy grass.

Of course, some mulch plates can be manually installed when mowing around a landscaped area and then removed when such mowing has been completed. This may not be a practical solution for at least two reasons. First, the inventors are unaware of any prior mowers having a mulch plate that can be quickly, easily and reliably installed in a minimum amount of time. Second, efficient use of time is absolutely essential for commercial lawn mowing services. Specifically, time utilized to intermittently install and remove a mulch plate for mowing along the landscaped areas can be detrimental to expeditious utilization of a workman's time while operating a mower.

This is particularly true for a workman operating a riding mower. At each landscaped area, the workman must climb off the riding mower to install the mulch plate over the deck opening, climb back on the riding mower to mow along the landscaped area, climb back off the riding mower to remove the mulch plate, and then climb back on the riding mower to continue mowing until the next landscaped area is reached whereat the same climb off, climb on, climb off again, climb on again procedure must be repeated. A considerable amount of valuable time is unproductively wasted just installing and removing the mulch plate.

Some prior art riding mowers have mulch plates which can be remotely activated and deactivated by the workman while remaining seated on the riding mower. Unfortunately, however, most if not all of such remotely-controlled mulch plates are designed in such a manner that they invite damage from collisions with various obstacles, such as tree trucks or decorative boulders, for example, due to their extension beyond the protective confines of the riding mower, both while the mulch plate is activated and is deactivated.

What is needed is an accessory for intermittently blocking the discharge opening of a riding mower that can be easily and quickly manually installed and removed in a manner which substantially reduces the amount of time needed to perform the install/remove procedure for the accessory and in manner that minimizes or eliminates potential damage to the accessory which might other wise result from collisions with various obstacles.

SUMMARY OF THE INVENTION

The improvements of the present invention for a quickly installable mulch-type plate for a walk-behind or riding mower having a deck with a deck opening for operably discharging grass clippings, the improvements including a removable mechanism, a connector mechanism, and a lock mechanism.

The removable mechanism includes a covering portion, dimensioned to operably cover the deck opening of the mower, and a handle portion having a grip and operably extending upwardly from the covering portion.

The connector mechanism, which is fixedly secured to the deck of the mower, is structured and dimensioned to removably mount the removable mechanism to the deck of the mower wherein the covering portion assumes a vertically-oriented blocking position adjacent to and covering the deck opening whereat grass clippings are operably prevented from being discharged through the deck opening of the mower. The connector mechanism includes an L-shaped portion having a vertically-oriented first side, a horizontally-oriented second side fixedly mounted to the deck of the mower alongside the deck opening, a first end, and a second end.

The connector mechanism also includes first and second hinge elements removably mounting the removable mechanism to the first end of the L-shaped portion. The first hinge element includes an orifice and is fixedly secured to the L-shaped portion at or near the first end thereof. The second hinge element includes a proximal end mounted to the rear side of the removable mechanism, a side edge, and a cylindrically-shaped peg extending outwardly from the side edge wherein the diameter of the peg is smaller than the diameter of the orifice such that the peg is slidably insertable endwise into the orifice.

The connector mechanism further includes first and second stop elements removably mounting the removable mechanism to the second end of the L-shaped portion. The first stop element includes vertically-oriented end and edge elements fixedly secured to the second end of the L-shaped portion. The second stop element includes a stop edge and a proximal end fixedly secured to the rear side of the removable mechanism. The spacing between the stop edge of the second stop element and the side edge of the second hinge element is less than the spacing between the end element of the first stop element and the first hinge element. The second stop element is slidable vertically downwardly beside the end element of the first stop element and between the vertical side portion of the L-shaped portion and the edge element of the first stop element.

The lock mechanism, which is structured and dimensioned to selectively and releasably lock the covering portion of the removable mechanism in the blocking position, includes a tapped bore through the removable mechanism and a threaded rod with a gripping device. The tapped bore is positioned wherein, when the removable portion is mounted to the deck in the blocking position, the rod is threadably advanceable relative to the tapped bore wherein the rod abuttingly engages the vertical side portion of the L-shaped portion thereby locking the removable mechanism in the blocking position.

The improvements also include a kit for applying the present invention to an existing walk-behind or riding mower.

PRINCIPAL OBJECTS AND ADVANTAGES OF THE INVENTION

The principal objects and advantages of the present invention include: providing an accessory for intermittently blocking the discharge opening of a walk-behind or riding mower; providing such an accessory that is easily and quickly manually installable and removable; providing such an accessory that is installable and removable while remaining seated on a riding mower; providing such an accessory that is mounted and structured in a manner that minimizes or eliminates potential damage to the accessory that might otherwise result from collisions with various obstacles in areas being mowed; and generally providing such an accessory that is reliable in performance, capable of long-lasting life, and particularly well adapted for the proposed usages thereof.

Other objects and advantages of this invention will become apparent from the following description taken in conjunction with the accompanying drawings wherein are set forth, by way of illustration and example, certain embodiments of this invention.

BRIEF DESCRIPTION OF THE DRAWINGS

FIG. 1 is a side elevational view of a mulch-type accessory installed on a mower, according to the present invention.

FIG. 2 is an enlarged rear view of a removable mechanism of the mulch-type accessory shown in FIG. 1.

FIG. 3 is an enlarged and fragmentary front view of a connector mechanism of the mulch-type accessory.

FIG. 4 is an enlarged and fragmentary top plan view of the connector mechanism of the mulch-type accessory.

FIG. 5 is an enlarged cross-sectional view of a first hinge element of the connector mechanism of the mulch-type accessory taken along line 5-5 of FIG. 4.

FIG. 6 is an enlarged top plan view of the removable mechanism of the mulch-type accessory.

FIG. 7 is an enlarged top plan view of first and second stop elements of the connector mechanism of the mulch-type accessory.

FIG. 8 is an enlarged cross-sectional view of a releasable lock mechanism of the mulch-type accessory.

FIG. 9 is an enlarged cross-sectional view of another releasable lock mechanism of the mulch-type accessory, according to the present invention.

FIG. 10 is a schematic representation of a removable mechanism of the mulch-type accessory for a riding mower having a non-planar deck opening, according to the present invention.

DETAILED DESCRIPTION OF THE INVENTION

As required, embodiments of the present invention are disclosed herein, however, it is to be understood that the disclosed embodiments are merely exemplary of the invention, which may be embodied in various forms. Therefore, specific structural and functional details disclosed herein are not to be interpreted as limiting, but merely as a basis for claims and as a representative basis for teaching one skilled in the art to variously employ the present invention in virtually any appropriately detailed structure.

The principal object of the quickly installable mulch-type accessory of the present invention for a riding mower is not for mulching purposes but, instead, is for intermittently interfering with grass clippings, which would otherwise be discharged from the mower, in order to prevent those grass clippings from being discharged onto surrounding areas adjacent to a lawn being mowed by the mower. Between those intermittent interferences, the accessory is removed in order for the grass clippings to be discharged onto the lawn as usual.

The reference numeral 10 generally refers to an accessory for a walk-behind or riding mower 12 having a deck 14 with a deck opening 16, in accordance with the present invention, as shown in FIGS. 1 through 10. The present invention 10 includes a removable mechanism 21, a connector mechanism 23, and a lock mechanism 25.

The removable mechanism 21 includes a covering portion 31 and a handle portion 33. The covering portion 31 includes a first edge 35, a second edge 37, a top edge 39, and a rear side 41. The handle portion 33 extends upwardly from the covering portion 31 and generally includes a grip 43, such as a finger orifice 43 therethrough, as shown in FIG. 2. The covering portion 31 is dimensioned to cover the deck opening 16 when in use as described herein.

The connector mechanism 23 includes an L-shaped portion 51 having a vertically-oriented first side 53, a horizontally-oriented second side 55 fixedly mounted to the deck 14 alongside the deck opening 16, and a longitudinal axis 57. The connector mechanism 23 also includes a first hinge element 59, a second hinge element 61, a first stop element 63, and a second stop element 65.

The first hinge element 59 is fixedly secured at or near a first end 67 of the L-shaped portion 51. The first hinge element 59 includes an orifice 69 with an axis 71 aligned parallel with the longitudinal axis 57 of the L-shaped portion 51, as shown in FIGS. 4 and 5.

The second hinge element 61 includes a proximal end 75, a distal end 77, and a side edge 79. A cylindrically-shaped peg 81, having a distal end 83 and a longitudinal axis 85, extends outwardly from the side edge 79, as shown in FIGS. 2 and 6. The diameter of the peg 81 is smaller than the diameter of the orifice 69 of the first hinge element 59. Proximal end 75 of the second hinge element 61 is fixedly secured to the rear side 41 of the removable mechanism 21 in the vicinity of the first and top edges 35, 39, such that the covering portion 31 operably covers the deck opening 16 when in use as described herein.

Alternately, the second hinge element 61 may be pivotally mounted to the removable mechanism 21 wherein, after the peg 81 is inserted into the orifice 69, the second hinge element 61 rotates about an axis 87 as the removable mechanism 21 is tilted in order to lower the second stop element 65 into the L-shaped portion 51, as shown in FIG. 6 and as described herein.

The first stop element 63, which is fixedly secured to a second end 91 of the L-shaped portion 51, extends upwardly from the L-shaped portion 51. For example, the first stop element 63 may be angularly-shaped with an end element 93 extending perpendicularly to both of the vertical and horizontal sides 53, 55 of the L-shaped portion 51, and an edge element 95 extending perpendicularly to the end element 93 and parallel to the vertical side 53 of the L-shaped portion 51, as shown in FIGS. 3, 4 and 7. The end element 93 is spaced apart from the first hinge element 59 by a first dimension 97.

The second stop element 65 includes a proximal end 101 and a stop edge 103. The proximal end 101 is fixedly secured to the rear side 41 of the removable mechanism 21 in the vicinity of the second and top edges 37, 39 and extends outwardly from the rear side 41 of the removable mechanism 21, as shown in FIGS. 6 and 7.

Spacing 105 between the stop edge 103 of the second stop element 65 and the side edge 79 of the second hinge element 59, as shown in FIG. 2, is less than the spacing 97 between the end element 93 of the first stop element 63 and the first hinge element 59 as shown in FIG. 4, and the spacing between the stop edge 103 of the second stop element 65 and the distal end 83 of the peg 81 is greater than the spacing between the end element 93 of the first stop element 63 and the first hinge element 59.

The end element 93 is dimensioned and spaced such that when the peg 81 is slidably inserted endwise into the orifice 69, the second stop element is slidable vertically downwardly beside the end element 93 of the first stop element 63 and between the vertical side portion 53 of the L-shaped portion 51 and the edge element 95 of the first stop element 63 with the edge element 95 being received in a slot 99 in the second stop element 65 (see FIGS. 6 and 7) such that the covering portion 31 depends downwardly covering the deck opening 16, as shown in FIG. 1 and sometimes referred to herein as the blocking position 113.

The lock mechanism 25 is structured and dimensioned to releasably secure the removable mechanism 21 in the blocking position 113, whereat the covering portion 31 operably prevents grass clippings from being discharged through the deck opening 16 of the mower 12. For example, the lock mechanism 25 may include a threaded rod 115 extending through a tapped bore 117 through the removable mechanism 21 such that the rod 115 can be threadably advanced relative to the bore 117 to abuttingly engage the vertical side portion 53 of the L-shaped portion 51, thereby securing the covering portion 31 in the blocking position 113. Preferably, the rod 115 includes a gripping device such as an extension 119 (see FIGS. 6 and 8), a wing device 121 (see FIG. 9), or other suitable arrangement which enables a user to manually and releasably secure the removable mechanism 21 to the connector mechanism 23, thereby eliminating the need for a tool to install and remove the removable mechanism 21.

For some applications, it may be desirable to include a plurality of openings 131 through the covering portion 31 for air flow purposes.

It is foreseen that the present invention may be included as an integral part of walk-behind or riding mowers at the factory when the mowers are being manufactured.

It is also foreseen that the present invention may be in the form of a kit which can be installed on an existing walk-behind or riding mower. Since the perimeter of the deck opening 16 of some mowers may be non-planar, the covering portion 31 of the removable mechanism 21 may need to have a non-planar configuration to accommodate such non-planer deck openings, such as that suggested in FIG. 10.

In an application of the present invention, as an operating walk-behind or riding mower 12 approaches a landscaped area, the user lifts the removable mechanism 21 by the handle portion 33, tilts the removable mechanism 21 and inserts the peg 81 into the orifice 69 and slides the second stop portion 65 vertically into the spacing 97 between the vertical side portion 53 of the L-shaped portion 97 and the edge element 95 of the first stop element 63, and manually spins the rod 115 in the bore 117 with the extension 119 or wing device 121 until the rod 115 abuttingly engages the vertical side portion 53 thereby locking the covering portion 31 of the removable mechanism 21 in the blocking position 113. In so doing and in a minimal amount of time, the mower has been temporarily and quickly modified whereby unsightly grass clippings are prevented from being thrown onto the landscaped area.

After mowing along and around the landscaped area, the user can quickly and easily remove the removable mechanism 21 by threadably releasing the rod 115 from its abutting engagement with the vertical side portion 53 of the L-shaped portion 51, then using the handle portion 33 to tilt the removable mechanism 21 up and out of the L-shaped portion 51 while withdrawing the peg 81 from the orifice 69, thereby removing the covering portion 31 from the blocking position 113 beside the deck opening 16.

Preferably, the invention includes a means for storing the removable mechanism 21 in a convenient location, such as on a hook 133 mounted on the mower and passing through the handle portion 33, as indicated in FIG. 1 where the stored removable mechanism 21 is shown in dashed lines and where the removable mechanism 21 is readily available when the deck opening 16 again needs to be blocked in order to mow along and around another landscaped area.

It is to be understood that while certain forms of the present invention have been illustrated and described herein, it is not to be limited to the specific forms or arrangement of parts as described and shown.

What is claimed and desired to be covered by Letters Patent is as follows:

1. An accessory for a riding mower having a deck with a deck opening for operably discharging grass clippings, the accessory comprising:
   (a) a removable mechanism having a rear side, a covering portion dimensioned to operably cover the deck opening of the riding mower, and a handle portion having a grip and extending upwardly from the covering portion;
   (b) a connector mechanism fixedly secured to the deck of the riding mower, the connector mechanism structured and dimensioned to removably mount the removable mechanism to the deck of the riding mower wherein the covering portion assumes a blocking position whereat grass clippings are operably prevented from being discharged through the deck opening of the riding mower, the connector mechanism including:
      (1) an L-shaped portion having a vertically-oriented first side, a horizontally-oriented second side fixedly mounted to the deck of the riding mower alongside the deck opening, a first end, and a second end;
      (2) first and second hinge elements removably mounting the removable mechanism to the first end of the L-shaped portion wherein:
         (A) the first hinge element includes an orifice and is fixedly secured to the L-shaped portion at or near the first end thereof, and
         (B) the second hinge element includes a proximal end mounted to the rear side of the removable mechanism, a side edge, and a cylindrically-shaped peg extending outwardly from the side edge wherein the diameter of the peg is smaller than the diameter of the orifice;
      (3) first and second stop elements removably mounting the removable mechanism to the second end of the L-shaped portion wherein:
         (A) the first stop element includes vertically-oriented end and edge elements fixedly secured to the second end of the L-shaped portion, and
         (B) the second stop element includes a stop edge and a proximal end fixedly secured to the rear side of the removable mechanism, and
      (4) wherein the spacing between the stop edge of the second stop element and the side edge of the second hinge element is less than the spacing between the end element of the first stop element and the first hinge element, and
      (5) wherein, when the peg is slidably inserted endwise into the orifice, the second stop element is slidable vertically downwardly beside the end element of the first stop element and between the vertical side portion of the L-shaped portion and the edge element of the first stop element; and (c) a lock mechanism structured and dimensioned to selectively and releasably lock the covering portion of the removable mechanism adjacent to and covering the deck opening of the riding mower, the lock mechanism including:
  (1) a tapped bore through the removable mechanism, and
  (2) a threaded rod with a gripping device,
  (3) the tapped bore being positioned wherein, when the removable portion is mounted on the deck of the riding mower, the rod is threadably advanceable relative to the tapped bore wherein the rod abuttingly engages the connector mechanism thereby locking the removable mechanism in a vertical orientation adjacent to and covering the deck opening of the riding mower.

2. A kit for a riding mower to selectively prevent grass clippings from being discharged through an opening in a deck thereof, the kit comprising:
  (a) a removable mechanism having a covering portion dimensioned to operably cover the opening in the deck of the riding mower;
  (b) a connector mechanism fixedly securable to the deck of the riding mower, the connector mechanism structured and dimensioned to removably mount the removable mechanism to the deck of the riding mower wherein the covering portion assumes a blocking position adjacent to and covering the deck opening of the riding mower, the connector mechanism including:
    (1) an L-shaped portion having a vertically-oriented first side a horizontally-oriented second side fixedly mounted to the deck alongside the deck opening, a first end, and a second end:
    (2) first and second hinge elements removably mounting the removable mechanism to the first end of the L-shaped portion, wherein:
      (A) the first hinge element includes an orifice and is fixedly secured to the L-shaped portion at or near the first end thereof; and
      (B) the second hinge element includes a proximal end mounted to the rear side of the removable mechanism, a side edge, and a cylindrically-shaped peg extending outwardly from the side edge wherein the peg is slidably insertable into the orifice; and
    (3) first and second stop elements removably mounting the removable mechanism to the second end of the L-shaped portion, wherein:
      (A) the first stop element includes vertically-oriented end and edge elements fixedly secured to the second end of the L-shaped portion; and
      (B) the second stop element includes a stop edge and a proximal end fixedly secured to the rear side of the removable mechanism; and
      (C) wherein the spacing between the stop edge of the second stop element and the side edge of the second hinge element is less than the spacing between the end element of the first stop element and the first hinge element, and
      (D) wherein, when the peg is slidably inserted endwise into the orifice, the second stop element is slidable vertically downwardly beside the end element of the first stop element and between the vertical side portion of the L-shaped portion and the edge element of the first stop element; and
  (c) a lock mechanism structured and dimensioned to selectively and releasably lock the covering portion of the removable mechanism in the blocking position.

3. An accessory for a riding mower having a deck with a deck opening for operably discharging grass clippings, the accessory comprising:
  (a) a removable mechanism having a rear side and a covering portion dimensioned to operably cover the deck opening of the riding mower;
  (b) a connector mechanism fixedly secured to the deck of the riding mower, the connector mechanism structured and dimensioned to removably mount the removable mechanism to the deck of the riding mower wherein the covering portion assumes a blocking position whereat grass clippings are operably prevented from being discharged through the deck opening of the riding mower, the connector mechanism including:
    (1) an L-shaped portion having a vertically-oriented first side, a horizontally-oriented second side fixedly mounted to the deck alongside the deck opening, a first end, and a second end;
    (2) first and second hinge elements removably mounting the removable mechanism to the first end of the L-shaped portion, wherein:
      (A) the first hinge element includes an orifice and is fixedly secured to the L-shaped portion at or near the first end thereof; and
      (B) the second hinge element includes a proximal end mounted to the rear side of the removable mechanism, a side edge, and a cylindrically-shaped peg extending outwardly from the side edge wherein the peg is slidably insertable into the orifice; and
    (3) first and second stop elements removably mounting the removable mechanism to the second end of the L-shaped portion, wherein:
      (A) the first stop element includes vertically-oriented end and edge elements fixedly secured to the second end of the L-shaped portion; and
      (B) the second stop element includes a stop edge and a proximal end fixedly secured to the rear side of the removable mechanism; and
      (C) wherein the spacing between the stop edge of the second stop element and the side edge of the second hinge element is less than the spacing between the end element of the first stop element and the first hinge element, and
      (D) wherein, when the peg is slidably inserted endwise into the orifice, the second stop element is slidable vertically downwardly beside the end element of the first stop element and between the vertical side portion of the L-shaped portion and the edge element of the first stop element; and
  (c) a lock mechanism structured and dimensioned to selectively and releasably lock the covering portion of the removable mechanism in the blocking position.

4. The accessory for a riding mower as described in claim 3, wherein the removable mechanism includes a handle portion.

5. The accessory for a riding mower as described in claim 4, wherein the handle portion operably extends upwardly from the covering portion of the removable mechanism.

6. The accessory for a riding mower as described in claim 5, wherein the handle portion includes a grip.

7. The accessory for a riding mower as described in claim 3, wherein the proximal end of the second hinge element is fixedly mounted to the rear side of the removable mechanism.

8. The accessory for a riding mower as described in claim 3, wherein the proximal end of the second hinge element is pivotally mounted to the rear side of the removable mechanism.

9. The accessory for a riding mower as described in claim 3, wherein the lock mechanism includes:
 (a) a tapped bore through the removable mechanism; and
 (b) a threaded rod with a gripping device; and
 (c) the tapped bore being positioned wherein, when the removable portion is mounted on the deck of the riding mower, the rod is threadably advanceable relative to the tapped bore wherein the rod abuttingly engages the connector mechanism, thereby locking the removable mechanism in the blocking position.

* * * * *